(12) United States Patent
Nishikawa et al.

(10) Patent No.: US 10,661,385 B2
(45) Date of Patent: May 26, 2020

(54) LASER MACHINING APPARATUS PROJECTING GUIDE PATTERN ONTO WORKPIECE BY IRRADIATING VISIBLE LASER BEAM THEREON

(71) Applicant: BROTHER KOGYO KABUSHIKI KAISHA, Nagoya, Aichi (JP)

(72) Inventors: Yasuo Nishikawa, Aichi (JP); Yoshihisa Kusumoto, Aichi (JP)

(73) Assignee: BROTHER KOGYO KABUSHIKI KAISHA, Aichi-Ken (JP)

( * ) Notice: Subject to any disclaimer, the term of this patent is extended or adjusted under 35 U.S.C. 154(b) by 37 days.

(21) Appl. No.: 16/224,502

(22) Filed: Dec. 18, 2018

(65) Prior Publication Data
US 2019/0126396 A1 May 2, 2019

Related U.S. Application Data

(63) Continuation of application No. PCT/JP2017/017501, filed on May 9, 2017.

(30) Foreign Application Priority Data

Jul. 29, 2016 (JP) ................................ 2016-150019

(51) Int. Cl.
*B23K 26/082* (2014.01)
*B23K 26/359* (2014.01)
(Continued)

(52) U.S. Cl.
CPC ............ *B23K 26/082* (2015.10); *B23K 26/02* (2013.01); *B23K 26/032* (2013.01);
(Continued)

(58) Field of Classification Search
None
See application file for complete search history.

(56) References Cited

U.S. PATENT DOCUMENTS

| 2015/0314394 A1* | 11/2015 | Mori | G05B 19/4067 |
| | | | 219/121.83 |
| 2016/0018810 A1 | 1/2016 | Mori et al. | |
| 2017/0351240 A1* | 12/2017 | Li | G05B 19/19 |

FOREIGN PATENT DOCUMENTS

| JP | 2003225783 A | 8/2003 |
| JP | 2004306073 A | 11/2004 |

(Continued)

OTHER PUBLICATIONS

International Preliminary Report on Patentability issued in connection with related PCT Application No. PCT/JP2017/017501, dated Jan. 29, 2019. (6 pages).

(Continued)

*Primary Examiner* — Sean Shechtman
(74) *Attorney, Agent, or Firm* — K&L Gates LLP (57) ABSTRACT

A laser machining apparatus includes: a laser beam emission device; a visible laser beam emission device; a scanner; and a controller. The controller is configured to perform: generating machining data including coordinate data representing a machining pattern to be machined on a workpiece; machining the workpiece with a laser beam according to the machining data by controlling the laser beam emission device and the scanner; generating, in response to receiving a resuming command after the machining has been halted at a stopping position, a guide pattern based on a stopping point coordinate and the machining data, the guide pattern being used for resuming the machining from the stopping position, the stopping point coordinate indicating the stopping position and being determined by the coordinate data; and projecting the guide pattern onto the workpiece with a visible laser beam by controlling the visible laser beam emission device and the scanner.

15 Claims, 9 Drawing Sheets

(51) Int. Cl.
B23K 26/02      (2014.01)
G05B 19/4067    (2006.01)
B23Q 15/00      (2006.01)
B23K 26/042     (2014.01)
B23K 26/03      (2006.01)
B23K 26/044     (2014.01)
B23K 26/352     (2014.01)
B23K 26/361     (2014.01)
B23K 26/0622    (2014.01)

(52) U.S. Cl.
CPC .......... *B23K 26/042* (2015.10); *B23K 26/044* (2015.10); *B23K 26/0622* (2015.10); *B23K 26/355* (2018.08); *B23K 26/359* (2015.10); *B23K 26/361* (2015.10); *B23Q 15/00* (2013.01); *G05B 19/4067* (2013.01); *G05B 2219/31048* (2013.01); *G05B 2219/45165* (2013.01)

(56) References Cited

FOREIGN PATENT DOCUMENTS

| | | |
|---|---|---|
| JP | 2015-196167 A | 11/2015 |
| JP | 2016019997 A | 2/2016 |

OTHER PUBLICATIONS

International Search Report for Application No. PCT/JP2017/017501, dated Jul. 11, 2017.

\* cited by examiner

LASER MACHINING APPARATUS PROJECTING GUIDE PATTERN ONTO WORKPIECE BY IRRADIATING VISIBLE LASER BEAM THEREON

CROSS REFERENCE TO RELATED APPLICATION

This application is a bypass continuation application of International Application No. PCT/JP2017/017501 filed May 9, 2017 in the Japan Patent Office acting as Receiving Office, claiming priority from Japanese Patent Application No. 2016-150019 filed Jul. 29, 2016. The entire contents of each of these applications are incorporated herein by reference.

TECHNICAL FIELD

The present disclosure relates to a laser machining apparatus.

BACKGROUND

A technique for a laser machining apparatus to resume laser beam machining after machining has been interrupted or halted is well known in the art (see Japanese Patent Application Publication No. 2003-225783 and Japanese Patent Application Publication No. 2016-19997, for example). According to one conventional method, the device receives a selection indicating whether to resume machining after laser beam machining has been halted and completes the remainder of the laser beam machining operation when resumption has been selected. Another conventional laser machining system enables the visual recognition of the interruption point at which laser beam machining was interrupted.

SUMMARY

However, in some cases the laser-machining position on the workpiece during laser beam machining shifts after the laser machining apparatus interrupts the machining operation. If the position of the workpiece upon resumption of machining differs from the position just prior to the interruption, the apparatus may be unable to achieve laser beam machining in accordance with the user's desired pattern. Such alignment of the workpiece is not addressed in the conventional technologies described above.

In view of the foregoing, it is an object of the present disclosure to provide a laser machining apparatus capable of facilitating the alignment of a workpiece when laser beam machining is interrupted.

In order to attain the above and other objects, the present disclosure provides a laser machining apparatus that includes: a laser beam emission device; a visible laser beam emission device; a scanner; and a controller. The laser beam emission device is configured to emit a laser beam. The visible laser beam emission device is configured to emit a visible laser beam. The scanner is configured to scan the laser beam and the visible laser beam in a scanning direction. The controller is configured to perform: (a) generating machining data based on a machining job, the machining data including coordinate data representing a machining pattern to be machined on a workpiece; (b) machining the workpiece with the laser beam according to the machining data by controlling the laser beam emission device and the scanner; (c) generating, in response to receiving a resuming command after the (b) machining has been halted at a stopping position, a guide pattern based on a stopping point coordinate and the machining data, the guide pattern being used for resuming the (b) machining from the stopping position, the stopping point coordinate indicating the stopping position and being determined by the coordinate data; and (d) projecting the guide pattern onto the workpiece with the visible laser beam by controlling the visible laser beam emission device and the scanner.

BRIEF DESCRIPTION OF THE DRAWINGS

The particular features and advantages of the disclosure as well as other objects will become apparent from the following description taken in connection with the accompanying drawings, in which.

DETAILED DESCRIPTION

<Overall Structure of a Laser Machining System>

The overall structure of a laser machining system 1 according to an embodiment will be described with reference to FIG. 1. The laser machining system 1 according to the embodiment is provided with a personal computer (PC) 2, a laser machining apparatus 3, and the like. The laser machining apparatus 3 also includes a main apparatus body 5, a laser controller 6, and the like. The laser machining apparatus 3 performs laser beam machining by scanning a laser beam L two-dimensionally over a machining surface 7A of a workpiece 7 on the basis of information received from the PC 2 in order to mark the machining surface 7A with characters, symbols, graphics, and the like. In the following description, laser beam machining will also be referred to as "printing."

The PC 2 is configured of a notebook computer, for example, and includes a liquid crystal display (LCD) 56, a mouse 52, a keyboard 53, a battery (not illustrated), and the like. The PC 2 accepts machining commands from the user via the mouse 52 and the keyboard 53. The laser controller 6 is configured of a computer and is connected to the main apparatus body 5 and PC 2 so as to be capable of bi-directional communication with the same. The laser controller 6 controls the main apparatus body 5 on the basis of printing information, control parameters, various instruction information, and the like received from the PC 2.

First, the structure of the main apparatus body 5 will be described. In the description of the main apparatus body 5, the leftward direction, rightward direction, upward direction, and downward direction in FIG. 1 respectively correspond to the forward, rearward, upward, and downward directions relative to the main apparatus body 5. Further, the directions orthogonal to the upward/downward directions and frontward/rearward directions of the main apparatus body 5 correspond to the leftward/rightward directions of the main apparatus body 5. More specifically, the direction toward the near side of the drawing and direction toward the far side of the drawing in FIG. 1 respectively correspond to the rightward and leftward directions of the main apparatus body 5.

The main apparatus body 5 is configured of a main base 11, a laser oscillation unit 12 that emits the laser beam L, an optical shutter unit 13, a beam damper (not illustrated), a half mirror (not illustrated), a beam-guiding optical unit 15, a turning mirror 16, an optical sensor 17, a galvano scanner 18, and an fθ lens 19. The main apparatus body 5 is enclosed in a housing (not illustrated) having a substantially rectangular parallelepiped shape.

The laser oscillation unit 12 is configured of a laser oscillator 21, a beam expander 22, and a mounting base 23. The laser oscillator 21 is configured of a carbon dioxide ($CO_2$) laser oscillator or an yttrium aluminum garnet (YAG) laser oscillator, for example, and outputs the laser beam L for machining the machining surface 7A of the workpiece 7. The beam expander 22 is provided coaxially with the laser oscillator 21 and functions to adjust the diameter of the laser beam L (expand the beam diameter, for example). The mounting base 23 is fixed to the top surface of the main base 11 with a plurality of mounting screws 25 at a position toward the rear of the front-rear center position of the main base 11. The laser oscillator 21 is mounted on the mounting base 23 at a position for adjusting the optical axis of the laser beam L.

The optical shutter unit 13 is configured of a shutter motor 26, and a flat plate-like shutter 27. The shutter motor 26 has been configured of a stepping motor or the like. The shutter 27 is mounted on a shaft of the shutter motor 26 and rotates coaxially with the same. When the shutter 27 is rotated into the optical path of the laser beam L emitted from the beam expander 22, the shutter 27 reflects the laser beam L toward the beam damper (not illustrated) disposed on the right side of the optical shutter unit 13. On the other hand, when the shutter 27 is rotated to a position that does not intersect the optical path of the laser beam L, the laser beam L emitted from the beam expander 22 is incident on the half mirror (not illustrated) located in front of the optical shutter unit 13.

The beam damper (not illustrated) absorbs the laser beam L reflected by the shutter 27. The half mirror (not illustrated) is arranged in the optical path of the laser beam L and slopes in a direction frontward and leftward at an angle of forty-five degrees to the optical path. The half mirror transmits nearly all of the laser beam L incident on the rear side of the half mirror, while reflecting some of the laser beam L incident on the rear side of the half mirror (1% of the laser beam L, for example) toward the turning mirror 16 at an angle of forty-five degrees. The turning mirror 16 is disposed leftward from the approximate center position on the rear surface of the half mirror on which the laser beam L is incident.

The beam-guiding optical unit 15 is configured of a visible semiconductor laser 28 (see FIG. 2) that emits a visible laser beam, and a lens array (not illustrated) that collimates the visible laser beam emitted from the visible semiconductor laser 28 into a parallel beam. Here, the visible laser beam is a red laser beam, for example, and has a wavelength different from the laser beam L emitted from the laser oscillator 21. The beam-guiding optical unit 15 is disposed to the right of an approximate center position on the side of the half mirror (not illustrated) from which the laser beam L exits. As a result, the visible laser beam is incident on the approximate center position on the side of the half mirror from which the laser beam L exits at an incident angle of forty-five degrees relative to the front surface, i.e., the reflecting surface, of the half mirror and is reflected at a reflection angle of forty-five degrees onto the optical path of the laser beam L.

Here, the reflectance of the half mirror (not illustrated) is dependent on wavelength. Specifically, the surface of the half mirror is formed of a multilayer film structure that includes a dielectric layer and a metallic layer. The half mirror has a high reflectance for wavelengths of visible laser beams, but transmits most (99%) of light at the wavelength of the laser beam L.

The turning mirror 16 is disposed in the optical path of the laser beam L and slopes in a direction frontward and leftward so as to form an angle of forty-five degrees with a front-rear direction parallel to the optical path. Some of the laser beam L reflected off the rear surface of the half mirror is incident on the approximate center position of the reflecting surface of the turning mirror 16 at an incident angle of forty-five degrees. The turning mirror 16 reflects the laser beam L incident on the reflecting surface at the incident angle of forty-five degrees in the forward direction at a reflection angle of forty-five degrees.

The optical sensor 17 is configured of a photodetector or the like that detects the output intensity of the laser beam L. The optical sensor 17 is disposed forward of the approximate center position of the turning mirror 16 from which the laser beam L is reflected. Thus, the laser beam L reflected off the turning mirror 16 is incident on the optical sensor 17. The optical sensor 17 outputs a signal corresponding to the output intensity of the incident laser beam L to the laser controller 6.

The galvano scanner 18 is mounted on the main base 11 above a through-hole (not illustrated) formed in a front portion of the main base 11. The galvano scanner 18 directs the laser beam L emitted from the laser oscillation unit 12 and the visible laser beam reflected off the half mirror (not illustrated) downward and scans the laser beams two-dimensionally. The galvano scanner 18 includes a galvano X-axis motor 31, a galvano Y-axis motor 32, and a main unit 33. The galvano X-axis motor 31 and galvano Y-axis motor 32 are mounted on the main unit 33 by fitting the motor shafts of the galvano X-axis motor 31 and galvano Y-axis motor 32 into respective mounting holes so that the shafts are orthogonal to each other. A scanning mirror is mounted on the distal end of each motor shaft. The scanning mirrors oppose each other inside the galvano scanner 18. The laser beam L and visible laser beam are directed downward and scanned two-dimensionally by controlling the rotations of the galvano X-axis motor 31 and galvano Y-axis motor 32 to rotate the scanning mirrors. Here, the scanning directions include an X-direction, which is the front-rear direction relative to the main apparatus body 5, and a Y-direction, which is the left-right direction relative to the main apparatus body 5.

The fθ lens 19 focuses the laser beam L and visible laser beam scanned two-dimensionally by the galvano scanner 18 onto the machining surface 7A of the workpiece 7 disposed beneath the fθ lens 19.

<Electrical Structure of the Laser Machining System>

Figure 2:
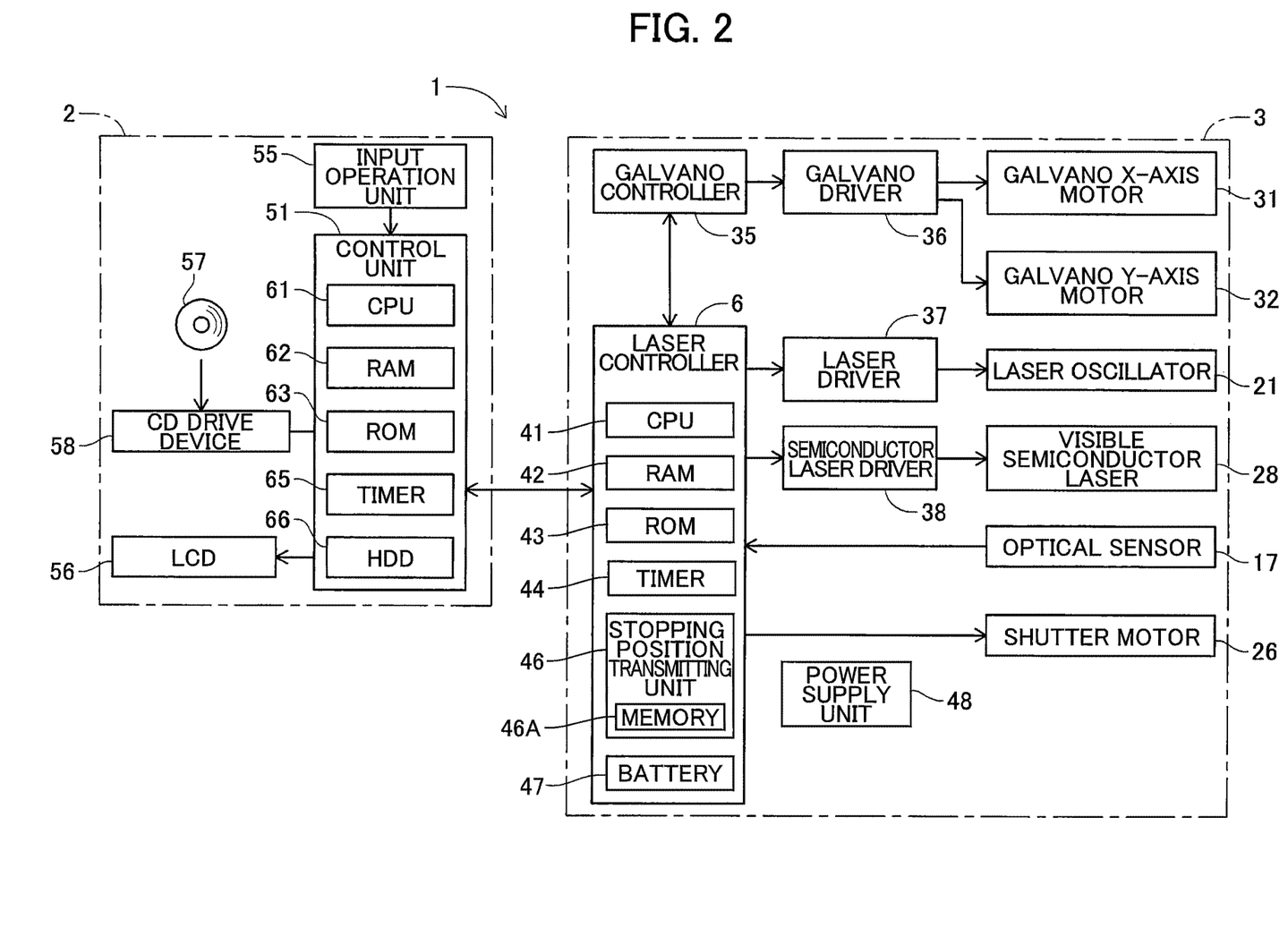
FIG. 2 is a block diagram illustrating an electric structure of the laser machining system according to the embodiment of the present disclosure.

Next, the electrical structure of the laser machining system 1 will be described with reference to FIG. 2.

Figure 1:
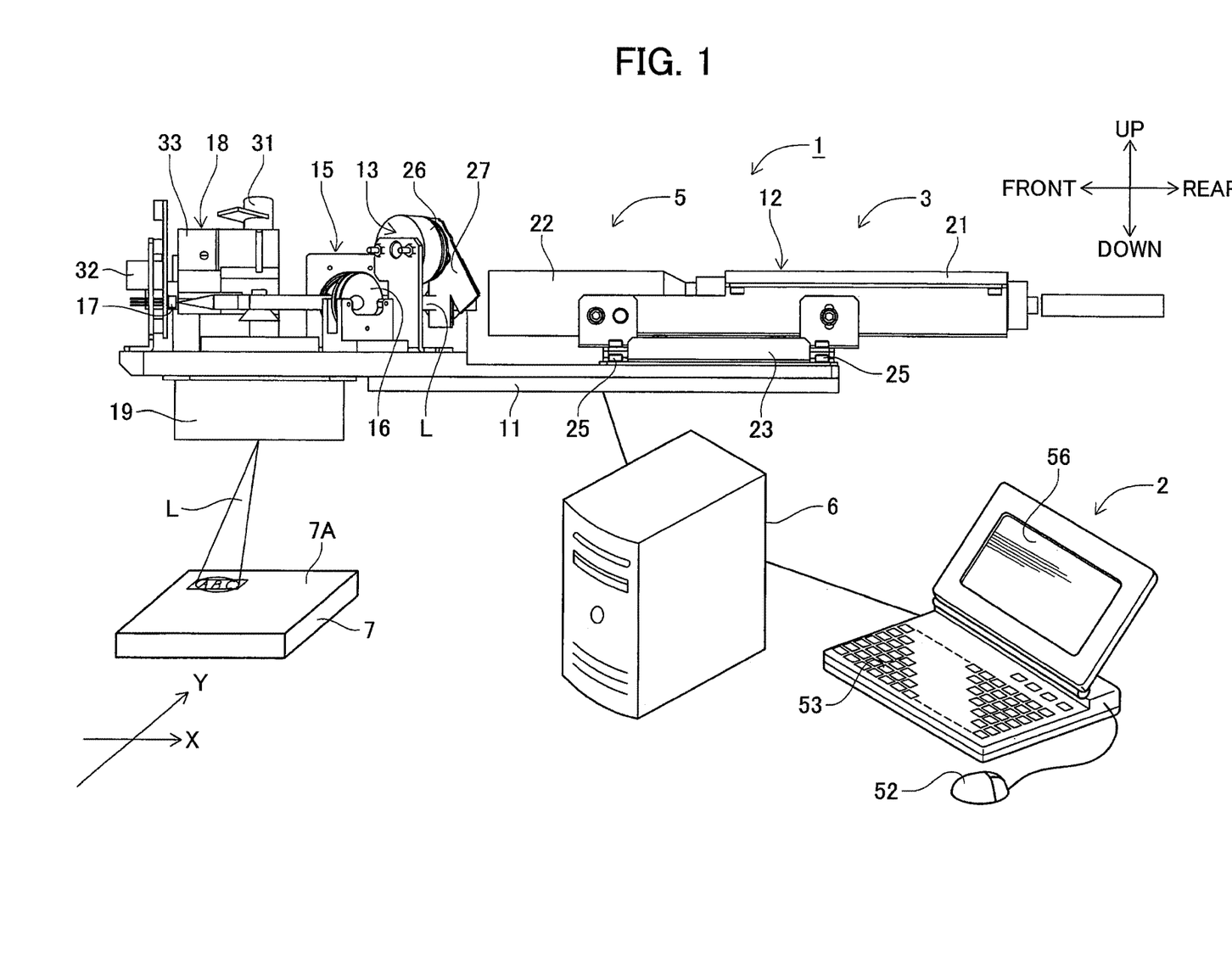
FIG. 1 is a schematic view of a laser machining system according to an embodiment of the present disclosure.

In addition to the structure illustrated in FIG. 1, the PC 2 includes a control unit 51, an input operation unit 55, a CD drive device 58, and the like. The control unit 51 includes a central processing unit (CPU) 61, a random access memory (RAM) 62, a read-only memory (ROM) 63, a timer 65, a hard disk drive (HDD) 66, and the like.

By executing various programs stored in the ROM 63, the CPU 61 controls the LCD 56, the input operation unit 55, and the like. The RAM 62 serves as the primary storage device that the CPU 61 uses when executing various processes. The ROM 63 stores control programs, character parameter information, reflectance information, and the like.

The character parameter information is parameter information for each font. For example, in the case of a stroke font, the character parameter information includes the coordinates of a center point of each character, and parameters for formulae used to render lines connecting points in the character. For outline fonts, the character parameter information includes coordinates for points constituting the outline of each character, and parameters for formulae used to render lines connecting points in the character. The reflectance information is information including a group describing material properties for which the reflectance of machined areas is smaller than the reflectance of non-machined areas, and a group describing material properties for which the reflectance of machined areas is greater than or equal to the reflectance of non-machined areas. For example, aluminum is listed in the group having a smaller reflectance in machined areas than that in non-machined areas, while matte black Alumite is listed in the group having a small reflectance in non-machined areas than that in machined areas.

The timer 65 is provided for measuring time to determine when the CPU 61 is to start a program, for example. The HDD 66 stores programs for various application software and various data files. The CPU 61, RAM 62, ROM 63, and timer 65 are interconnected through a bus (not illustrated). The CPU 61 and HDD 66 are also interconnected via an input/output interface (not illustrated).

The input operation unit 55 has the mouse 52, keyboard 53, and the like. The input operation unit 55 converts operations received via the mouse 52 and keyboard 53 to signals and outputs these signals to the CPU 61. The CD drive device 58 reads data stored on a CD-ROM 57 and writes data to the CD-ROM 57 according to commands received from the CPU 61.

In addition to the structures illustrated in FIG. 1, the laser machining apparatus 3 includes a galvano controller 35, a galvano driver 36, a laser driver 37, a semiconductor laser driver 38, a power supply unit 48, and the like. The galvano controller 35, laser driver 37, semiconductor laser driver 38, optical sensor 17, and shutter motor 26 are electrically connected to the laser controller 6.

The laser controller 6 is implemented by a computer and includes a CPU 41, a RAM 42, a ROM 43, a timer 44, a stopping position transmitting unit 46, a battery 47, and the like.

By executing various programs stored on the ROM 43, the CPU 41 controls the galvano controller 35, laser driver 37, semiconductor laser driver 38, shutter motor 26, and the like. The RAM 42 serves as the primary storage device that the CPU 41 uses when executing various processes. The timer 44 is provided for measuring time to determine when the CPU 41 is to start a program, for example. The battery 47 supplies electricity to the stopping position transmitting unit 46 and the like in the event that output from the power supply unit 48 is stopped due to a power outage, for example.

The stopping position transmitting unit 46 has a memory 46A for storing the latest X- and Y-coordinate data (described later) from among X- and Y-coordinate data that the laser controller 6 outputs sequentially to the galvano controller 35. When power supplied from the power supply unit 48 is halted, the stopping position transmitting unit 46 receives power from the battery 47 and executes a transmission process to transmit the latest X- and Y-coordinate data to the PC 2. The CPU 41, RAM 42, ROM 43, and timer 44 are interconnected via a bus (not illustrated).

The galvano controller 35 calculates drive angles and rotational speeds of the galvano X-axis motor 31 and galvano Y-axis motor 32 using X- and Y-coordinate data, laser driving data, and the like (described later) inputted from the laser controller 6 and outputs motor drive information representing the calculated drive angles and rotational speeds to the galvano driver 36. The galvano driver 36 drives the galvano X-axis motor 31 and galvano Y-axis motor 32 according to the motor drive information representing the drive angles and rotational speeds inputted from the galvano controller 35.

The laser driver 37 drives the laser oscillator 21 according to laser driving data specifying the laser output of the laser oscillator 21, the laser pulse width of the laser beam L, and the like; laser output control signals for the laser oscillator 21; and the like inputted from the laser controller 6. The semiconductor laser driver 38 turns the laser oscillator 21 on and off according to ON signals and OFF signals inputted from the laser controller 6.

The power supply unit 48 is connected to a commercial power source via a power cord (not illustrated). The power supply unit 48 converts AC power supplied from the commercial power source to DC power and supplies this DC power to the components of the laser machining apparatus 3.

Note that the scanning speed for scanning the visible laser beam has a predetermined upper limit. Consequently, if the display data is large in volume, points drawn by the visible laser beam may visibly blink, making the drawn pattern appear to flicker.

<Machining Process>

Next, a machining process performed by the laser machining system 1 will be described with reference to FIGS. 3 and 4. When power to the laser machining apparatus 3 is turned on and an application for the machining process is started on the PC 2, in S1 the PC 2 displays a reception screen on the LCD 56. The user makes operations on the input operation unit 55 to input various printing information in the reception screen, including information on the characters, symbols, graphics, and other features to be machined on the workpiece 7; the material properties of the workpiece 7; and the like. The PC 2 then executes a laser machining process based on the inputted printing information as a machining job. The PC 2 receives information on the desired characters, symbols, graphics, and the like to be machined in a layout displaying part of the reception screen, such as that illustrated in the example of FIG. 5A.

Figure 5A:
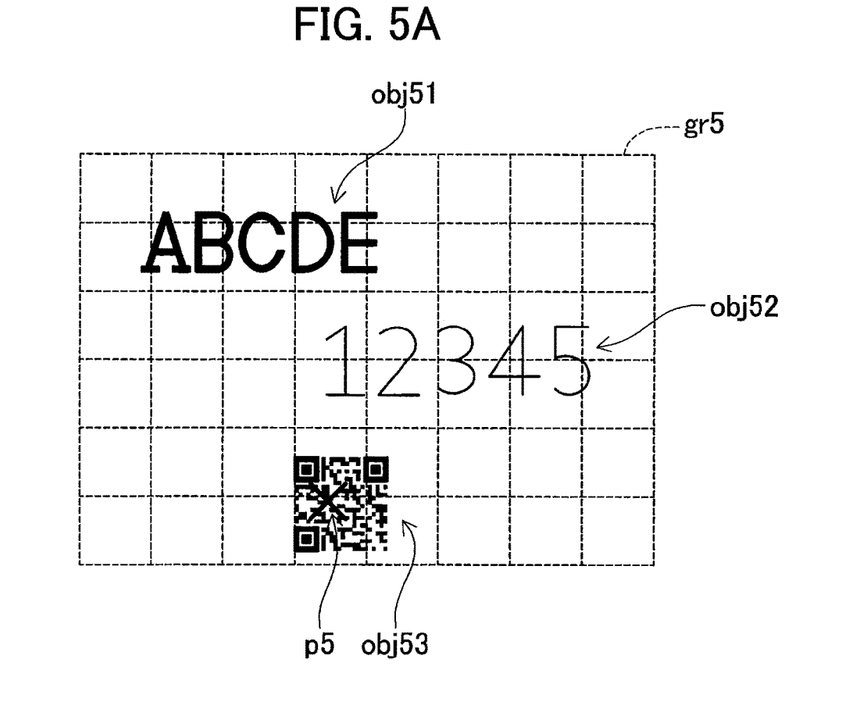
FIG. 5A is an explanatory diagram illustrating an example of a machining pattern.
Figure 5B:
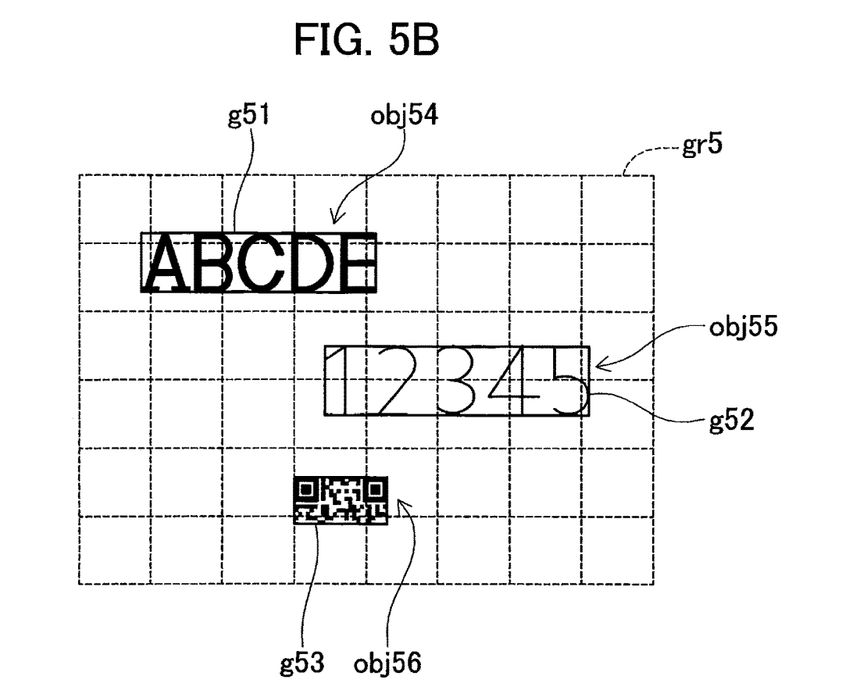
FIG. 5B is an explanatory diagram illustrating an example of a guide pattern corresponding to the machining pattern illustrated in FIG. 5A.

FIG. 5A illustrates an example in which three objects obj51, obj52, and obj53 making up the machining pattern. Gridlines gr5 forming a grid shape are displayed in the layout displaying part for aiding in the arrangement of objects. The object obj51 is a sequence of letters in the TrueType font (TTF). The object obj52 is a sequence of numbers in a stroke font. The object obj53 is a two-dimensional code. The CPU 61 of the PC 2 acquires data for the characters, graphics, and the like in each object and their positions and sizes as the printing information. In this example, an object is configured of a sequence of characters, symbols, graphics, and the like. FIGS. 5A and 5B will be described later in greater detail. A TTF is one example of an outline font. The outline fonts render characters and the like with outlines, and fill inside the outlines.

Figure 3:
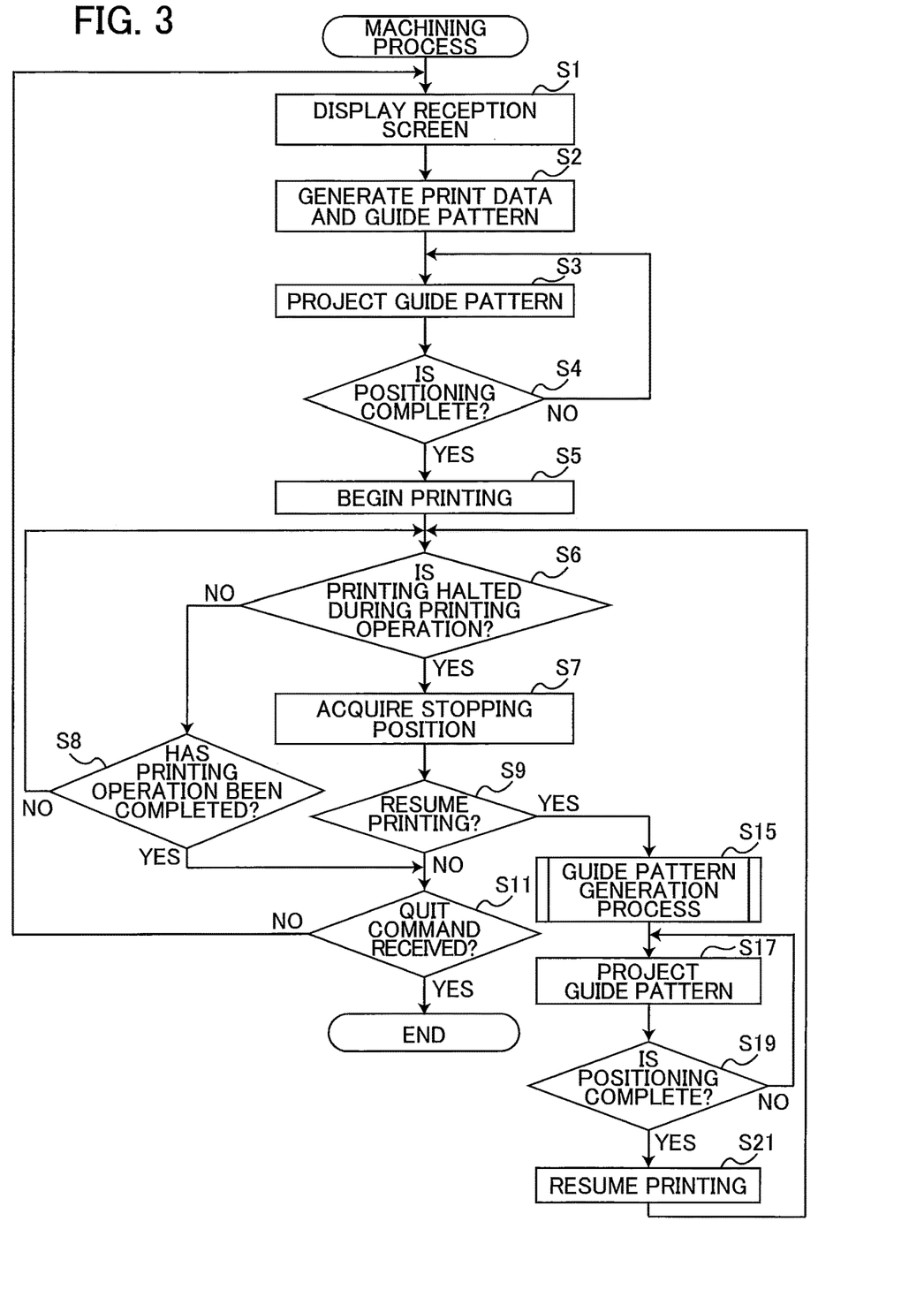
FIG. 3 is a flowchart illustrating steps in a machining process executed by the laser machining system of the embodiment.

In S2 of FIG. 3, the CPU 61 generates print data. The print data in this case, is information required for printing, including X- and Y-coordinate data and laser driving data. For example, if the object comprises characters or symbols, the CPU 61 extracts information from the character parameter information stored in the ROM 63 that corresponds to the type of font included in the printing information, generates X- and Y-coordinate data on the basis of the sizes and positions included in the printing information, and stores this X- and Y-coordinate data in the RAM 62. The X- and Y-coordinate data is generated by breaking down all lines of the object into line segments and specifying the start point coordinates and end point coordinates for each line segment. The CPU 61 also generates the laser driving data representing the laser output of the laser oscillator 21, the pulse width of the laser beam L, and the speed at which the galvano scanner 18 scans the laser beam L on the basis of the printing information.

In S2 the CPU 61 also generates a guide pattern on the basis of the printing information. The guide pattern serves to project guide marks by which the user can position the workpiece 7. In the present embodiment, a guide pattern is data indicating X- and Y-coordinates and the guide pattern generated in S2 is used for the initial positioning. In the example illustrated in FIG. 5A, a single frame that encloses the objects obj51, obj52, and obj53 serves as the guide pattern, for example. Next, the CPU 61 outputs this guide pattern to the laser controller 6.

Upon receiving the guide pattern, in S3 the CPU 41 of the laser machining apparatus 3 controls the galvano controller 35 and semiconductor laser driver 38 according to this guide pattern. Through this process, in S3 the laser machining apparatus 3 scans the visible laser beam to project guide marks onto the machining surface 7A of the workpiece 7 on the basis of the guide pattern.

The user positions the workpiece 7 on the basis of the projected guide marks. In S4 the CPU 61 determines whether positioning is complete. After positioning is complete, the user selects a Start Print button (not illustrated) displayed on the LCD 56, for example, to issue a command to begin printing. When the CPU 61 receives the command to begin printing, the CPU 61 determines that the user has finished positioning the workpiece 7 (S4: YES) and instructs the laser controller 6 to stop projecting the guide marks and to begin printing in S5.

At this time, the CPU 61 also outputs the X- and Y-coordinate data and the laser driving data. Here, the CPU 61 sequentially transmits X- and Y-coordinate data in units of objects, for example. Upon receiving instructions from the PC 2 to begin printing, the CPU 41 of the laser controller 6 instructs the galvano controller 35 to begin machining. The galvano controller 35 issues commands to the galvano driver 36 to begin driving the galvano X-axis motor 31 and galvano Y-axis motor 32, whereby printing begins in S5.

However, if positioning is not yet complete (S4: NO), the CPU 61 returns to S3 and waits until the user has completed positioning the workpiece 7 while projecting guide marks based on the guide pattern.

In the scanning procedure described below, the left-right direction and up-down direction will be used in place of the X-direction and Y-direction of the scanning directions. In this case, the positive X-direction will be right, and the negative X-direction left. Further, the positive Y-direction will be up, and the negative Y-direction down. The same terms will be used in the description of scanning directions. Note that the left-right direction and up-down direction used in the description of scanning directions are not same as the left-right direction and up-down direction relative to the main apparatus body 5 of the laser machining apparatus 3 illustrated in FIG. 1.

When the object is a two-dimensional code, the laser machining apparatus 3 performs a raster scan. That is, the laser machining apparatus 3 machines one row at a time sequentially from top to bottom, where one row contains an array of cells that denote the smallest unit of data in the two-dimensional code. When machining a single row, the laser machining apparatus 3 machines sequentially from the left cell toward the right cell. When machining a single cell, the laser machining apparatus 3 scans in both up and down directions. In other words, the laser machining apparatus 3 divides the two-dimensional code into a plurality of cells and fills a single cell with reciprocal rasters (in this case, reciprocating scans in the vertical direction). Cells are drawn by scanning rasters from the upper-left cell to the lower-right cell. When the object is an outline font, the laser machining apparatus 3 first performs vector scans along the outline of each character, and subsequently performs raster scans beginning from the upper-left of the region enclosed by the outline. When the object is a stroke font or a drawing drawn by a single line (single line drawing), the laser machining apparatus 3 performs vector scanning. Further, if the print data includes a plurality of objects, the objects are scanned sequentially according to a predetermined machining order.

In S6 the CPU 61 determines whether or not the laser machining apparatus 3 has halted printing during the printing operation. Here, an example will be described for the case in which the laser machining apparatus 3 halts printing due to a power outage. Note that the operating state of the PC 2 is maintained since the PC 2 is provided with a battery (not illustrated). If the communication (connection) state of the PC 2 with the laser machining apparatus 3 is offline, for example, the CPU 61 determines that the laser machining apparatus 3 has halted printing.

When the CPU 61 determines that printing has been halted (S6: YES), in S7 the CPU 61 acquires the stopping position and stores this stopping position in the RAM 62. In the present embodiment, when the power supplied from the power supply unit 48 is halted in the laser machining apparatus 3, the stopping position transmitting unit 46 of the laser controller 6 transmits the latest X- and Y-coordinate data to the PC 2, as described above. In S7 the CPU 61 of the PC 2 receives the latest X- and Y-coordinate data outputted from the laser controller 6 and stores this data as the stopping position in the RAM 62. On the other hand, when the CPU 61 determines that printing has not been halted (S6: NO), in S8 the CPU 61 determines whether the printing operation based on the print job has been completed. When the printing operation has not been completed (S8: NO), the CPU 61 returns to S6 and waits until the printing operation has been completed. When the CPU 61 determines that the printing operation has been completed (S8: YES), the CPU 61 advances to S11.

Upon receipt of the stopping position from the laser controller 6 in S7, the CPU 61 displays a screen on the LCD 56 that includes a Resume Printing button (not illustrated), for example. When power is restored, the user may turn on the power of the laser machining apparatus 3 and select the Resume Printing button on the LCD 56 if the user wishes to resume the interrupted printing operation.

In S9 the CPU 61 determines whether to resume printing. The CPU 61 determines to resume printing when the Resume Printing button is selected before a prescribed time has elapsed after the connection state with the laser machining apparatus 3 changed from offline to online, i.e., after communication with the laser machining apparatus 3 once again became possible. If the CPU 61 determines to resume printing (S9: YES), i.e., if the Resume Printing button is selected before the prescribed time has elapsed after communication between the PC 2 and the laser machining apparatus 3 became possible, the CPU 61 executes a guide pattern generation process in S15. The guide pattern generation process of S15 will be described later in detail. On the other hand, if the prescribed time elapses without the Resume Printing button being selected, the CPU 61 determines not to resume printing (S9: NO) and advances to S11.

When the CPU 61 determines that the printing operation has been completed (S8: YES), or determines not to resume printing (S9: NO), in S11 the CPU 61 determines whether a quit command was received to quit the machining process. For example, if a Quit Printing button (not illustrated) displayed on the LCD 56 was selected, the CPU 61 determines that a command to quit the machining process was received. When determining that a command to quit the machining process was not received (S11: NO), the CPU 61 returns to S1 to execute the next machining job. However, when determining that a command to quit the machining process was received (S11: YES), the CPU 61 ends the machining process.

Here, the guide marks projected by the laser machining apparatus 3 upon resumption will be described with reference to FIGS. 5A and 5B. In this description, the three objects obj51, obj52, and obj53 will be used as an example of the machining pattern. A point p5 indicated over the object obj53 denotes the stopping position. Note that the point p5 is not displayed in the layout displaying part. Further, the gridlines gr5 illustrated in FIG. 5A are also displayed in FIG. 5B to indicate the positional relationship with FIG. 5A. Note that gridlines are similarly illustrated in FIGS. 6 through 9 described later. Objects obj54 and obj55 in FIG. 5B denote the patterns formed by printing objects obj51 and obj52, respectively. An object obj56 in FIG. 5B denotes the pattern formed by printing a portion of the object obj53. Guide marks g51, g52, and g53 are graphics constituting the guide pattern. In this example, machining has stopped at the point p5 in the object obj53. In this case, objects obj54 and obj55 and the object obj56 constituting the pattern above the point p5 have been printed on the workpiece 7.

The guide marks g51 and g52 are rectangular frames constituting minimum bounding boxes that enclose the corresponding machined objects obj54 and obj55. The guide mark g53 is a rectangular frame constituting a minimum bounding box that encloses the object obj56 constituting the finished portion of an unfinished object. By projecting these guide marks g51, g52, and g53, the laser machining apparatus 3 enables the user to position the workpiece 7 such that the guide marks g51, g52, and g53 circumscribe the corresponding objects obj54, obj55, and obj56 printed on the workpiece 7, as illustrated in FIG. 5B. As will be described later, the example in FIGS. 5A and 5B pertains to a case in which the material properties of the workpiece 7 produce a lower reflectance in non-machined areas than in machined areas.

Next, the guide pattern generation process will be described. This process is performed to generate a guide pattern that is projected as a guide when resuming printing. Here, the case of machining the machining pattern illustrated in FIG. 5A, specifically, a case in which machining was halted at the point p5 while printing the object obj53, will be described as an example.

Figure 4:
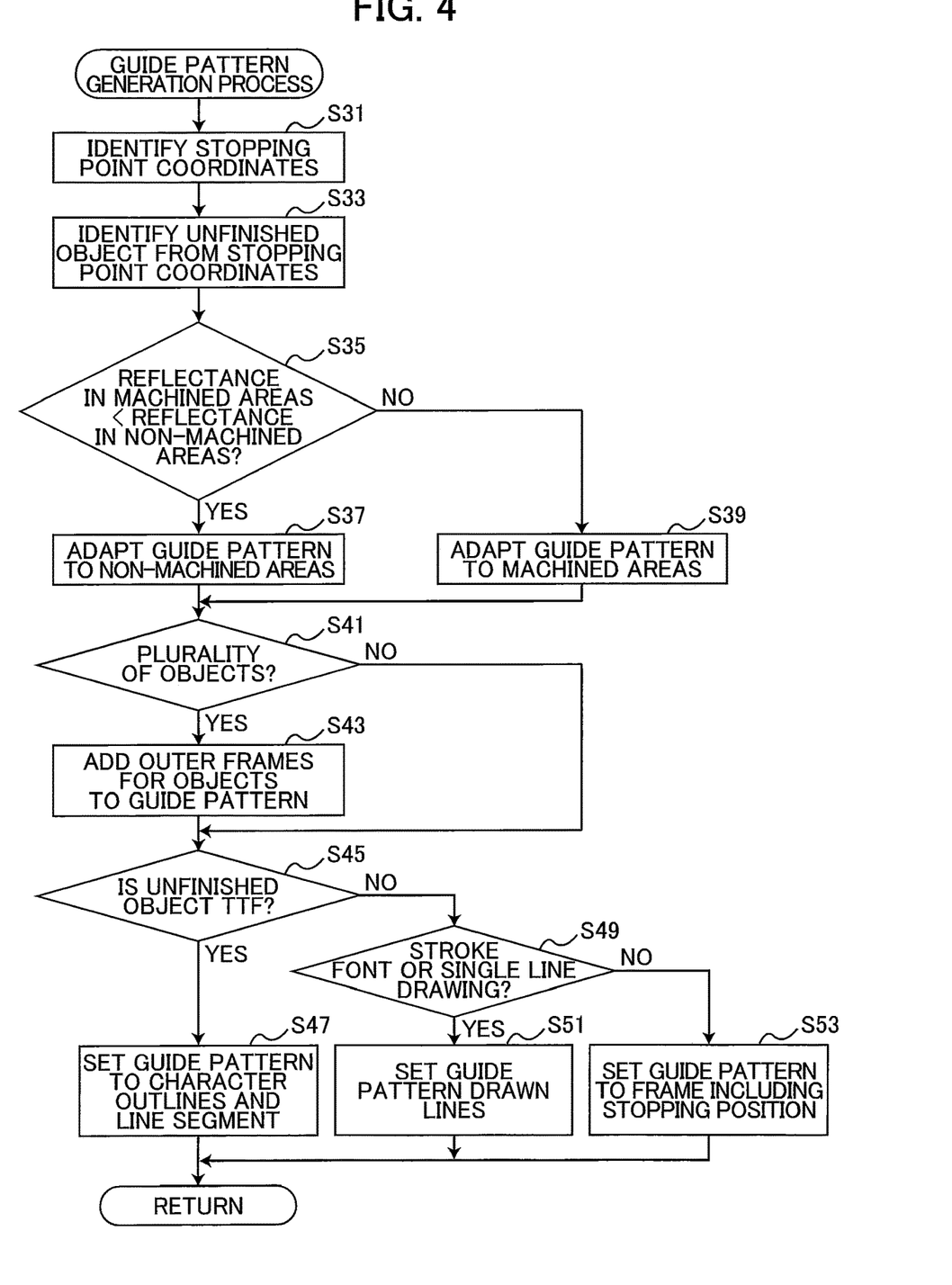
FIG. 4 is a flowchart illustrating steps in a guide pattern generation process.

FIG. 4 is a flowchart illustrating steps in the guide pattern generation process. In S31 at the beginning of the process, the CPU 61 of PC 2 identifies the stopping point coordinates. In S33 the CPU 61 identifies the unfinished object and the type thereof from the stopping point coordinates. The CPU 61 identifies the unfinished object that was being machined on the basis of the print data generated in S1 of the machining process illustrated in FIG. 3 and the stopping position stored in the RAM 62 in S7 of the machining process illustrated in FIG. 3. Since the point p5 identified as the stopping position is included in the object obj53, the CPU 61 determines that the unfinished object is the object obj53 and that the type of the unfinished object is a two-dimensional code.

In S35 the CPU 61 determines whether the reflectance in machined areas on the workpiece 7 is smaller than the reflectance in non-machined areas on the workpiece 7 in order to select whether to project guide marks in machined areas or non-machined areas. The CPU 61 retrieves the material properties of the workpiece 7 received via the reception screen from the reflectance information stored in the ROM 63 and determined that the reflectance of machined areas is smaller than the reflectance of non-machined areas for the workpiece 7 when those material properties belong to the group defining material properties whose reflectance is smaller in machined areas than in non-machined areas. This example will assume that the material properties of the workpiece 7 belong to a group whose reflectance in machined areas is greater than or equal to the reflectance in non-machined areas.

When the CPU 61 determines that the reflectance in machined areas of the workpiece 7 is not smaller than the reflectance in non-machined areas of the workpiece 7 (S35: NO), in S39 the CPU 61 determines to adapt the guide pattern to the machined areas. The inventors of the present disclosure have found that the guide marks are easier to see when projected on a highly reflective surface. Hence, by projecting guide marks in an area having high reflectance, the user can more easily position the workpiece 7 using these guide marks.

In S41 the CPU 61 determines whether the print data includes a plurality of objects. When the CPU 61 determines there is a plurality of objects (S41: YES), in S43 the CPU 61 calculates outer frames for objects corresponding to machined areas, excluding unfinished objects, on the basis of the print data, and adds these outer frames to the guide pattern. Note that "objects corresponding to machined areas" is used in this case because step S39 was executed. In this example, the objects obj51 and obj52, and not the object obj53, constitute objects in machined areas. Thus, the CPU 61 calculates a guide pattern specifying the guide marks g51 and g52 as outer frames for the objects obj51 and obj52.

<When the Unfinished Object is a Two-Dimensional Code>

In S45 of FIG. 4, the CPU 61 determines whether the unfinished object is a TTF-type object. Since the object obj53 in this example is not a TTF-type object (S45: NO), in S49 the CPU 61 determines whether the unfinished object is a stroke font or a single line drawing. Since the object obj53 in this example is not a stroke font or a single line drawing (S49: NO), in S53 the CPU 61 sets a frame that includes the stopping position as the guide pattern. Here, the outer frame for the machined area of the object obj53 is calculated and added to the guide pattern since step S39 was executed. Subsequently, the CPU 61 ends the guide pattern generation process and advances to S17 in FIG. 3.

In S17 the CPU 61 instructs the laser controller 6 of the laser machining apparatus 3 to project the guide marks based on the guide pattern generated in the guide pattern generation process. The CPU 41 of the laser controller 6 controls the galvano controller 35 and semiconductor laser driver 38 according to the inputted guide pattern received from the PC 2, whereby the laser machining apparatus 3 projects the guide marks g51, g52, and g53 illustrated in FIG. 5B. Using the projected guide marks, the user can adjust the position of the workpiece 7. In S19 the CPU 61 determines whether positioning is complete. For example, the CPU 61 determines that the user has finished positioning the workpiece 7 when the user selects a Positioning Complete button (not illustrated) displayed on the LCD 56. If positioning is complete (S19: YES), in S21 the CPU 61 resumes printing and returns to S5. However, if positioning is not yet complete (S19: NO), the CPU 61 returns to S17 and waits until the user has completed positioning the workpiece 7 while projecting guide marks.

Next, an additional description of the guide pattern generation process in FIG. 4 will be provided. When the print data includes only a single object, in S41 the CPU 61 determines that the print data does not have a plurality of objects (S41: NO). In this case, the CPU 61 skips S43 and generates a guide pattern for the unfinished object.

In the above description, the material properties of the workpiece 7 belong to the group of material properties whose reflectance in non-machined areas is less than or equal to the reflectance in machined areas. However, if the material properties of the workpiece 7 belong to the group whose reflectance in non-machined areas is greater than the reflectance in machined areas, in S35 the CPU 61 determines that the reflectance in the machined areas of the workpiece 7 is smaller than the reflectance in the non-machined areas of the workpiece 7 (S35: YES) and in S37 determines to adapt the guide pattern to the non-machined areas. In this case, in S43 the CPU 61 calculates outer frames of objects corresponding to the non-machined areas, excluding the unfinished object, and adds these outer frames to the guide pattern.

Figure 8:
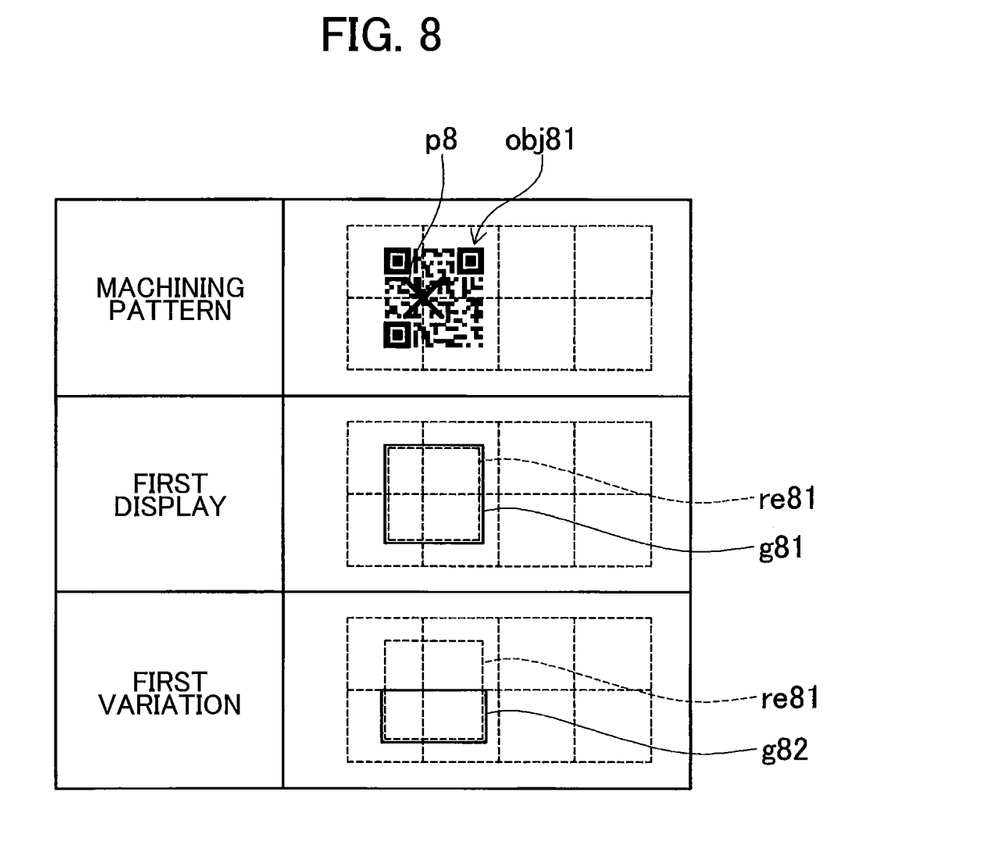
FIG. 8 is an explanatory diagram illustrating a machining pattern configured of an object which is a two-dimensional code and corresponding guide patterns.

Further, in S53 the CPU 61 calculates an outer frame for the non-machined area of the object obj53 and adds this outer frame to the guide pattern. A graphic illustrating the guide pattern for this case is a guide mark g82 illustrated in first variation of FIG. 8. The guide mark g82 denotes a graphic of the guide pattern projected when an object obj81, specified as the machining pattern in FIG. 8, is being printed but printing is interrupted at a point p8. The object obj81, which is the unfinished object in this example, is a two-dimensional code. The guide mark g82 is a rectangular frame open on the top that borders on and encloses the non-machined portion of the object obj81 serving as the unfinished object. In this case, the user can position the workpiece 7 by aligning the portion of the machining pattern on the workpiece 7 that has already been machined with the projected graphic in the guide pattern so that the region in the guide pattern indicates the remainder of the pattern to be machined. In order to indicate the relative positions of the object obj81 and guide mark g82 in the first variation of FIG. 8, the region of the object obj81 that has been printed is labeled as a region re81.

<When the Unfinished Object Is a TTF>

Figure 6:
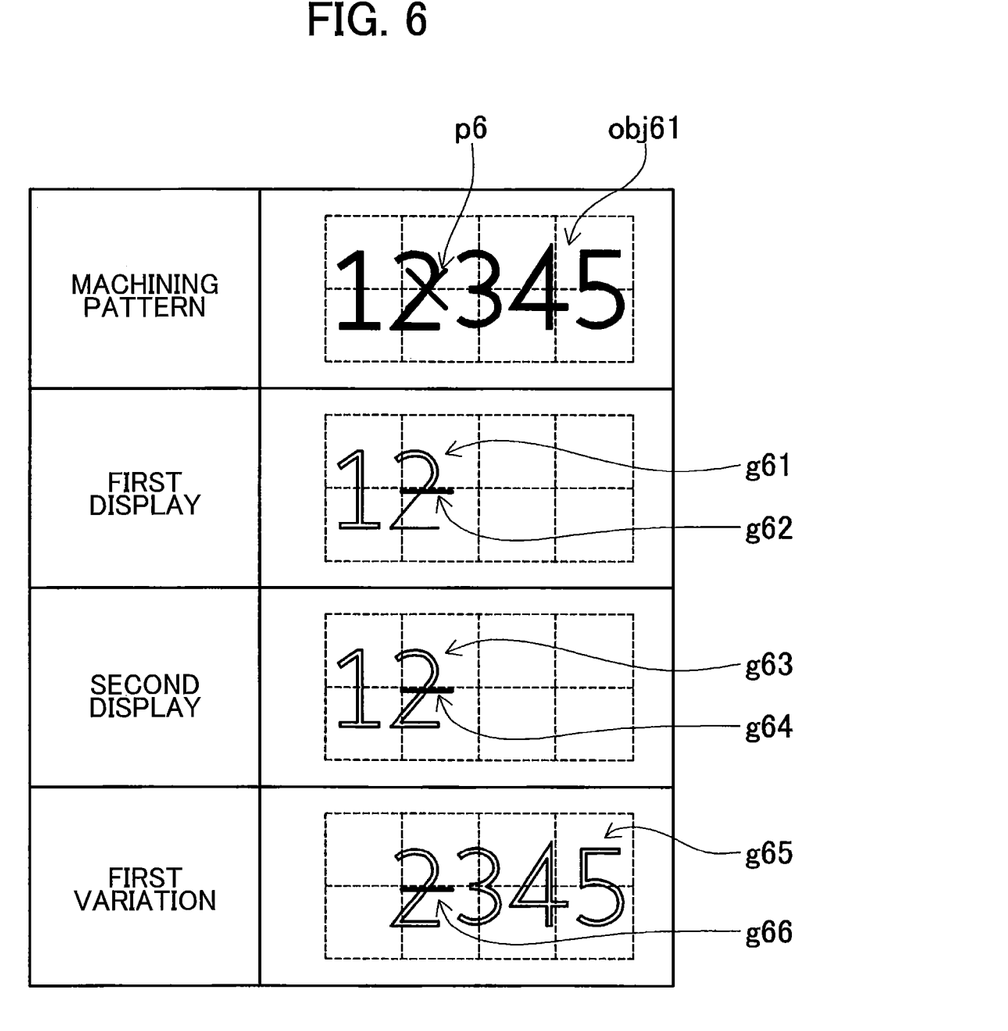
FIG. 6 is an explanatory diagram illustrating a machining pattern configured of an object in the TrueType font (TTF) and corresponding guide patterns.

The above description covers a case in which the unfinished object is a two-dimensional code. However, when the unfinished object is a TTF, in S45 the CPU 61 determines that the unfinished object is a TTF (S45: YES), in S47 sets the guide pattern to character outlines and a line segment, and subsequently ends the guide pattern generation process. The process in step S47 will be described next with reference to FIG. 6. In FIG. 6, the machining pattern is an object obj61 configured of numbers in a TTF, and the stopping position is a point p6.

As in FIGS. 5A and 5B, first display and second display in FIG. 6 illustrate cases in which the material properties of the workpiece 7 indicate a smaller reflectance in non-machined areas than that in machined areas. First variation in FIG. 6 illustrates a case in which the material properties of the workpiece 7 indicate a smaller reflectance in machined areas than that in non-machined areas. Further, the first display in FIG. 6 illustrates a case in which the point p6 is positioned on the outline of the number "2" in the object obj61, i.e., a case in which machining was halted while printing the outline. On the other hand, the second display and first variation of FIG. 6 illustrate cases in which the point p6 is positioned in a region surrounded by the outline of the number "2" in the object obj61, i.e., cases in which printing of the outline was completed and machining was halted after printing from the top of the region enclosed by the outline down to the position of point p6. In the cases of the first display and second display, the guide pattern includes guide mark g61 and guide mark g63, respectively, constituting the outline portion of the object obj61 that has been printed. Guide mark g62 and guide mark g64 are added to the respective guide patterns. The guide marks g62 and g64 are lines extending in the X-direction, which is one of the scanning directions of the galvano scanner 18, and passing through the point p6.

When the material properties of the workpiece 7 indicate a smaller reflectance in machined areas (first variation), the guide pattern is set to a guide mark g65, which is the outline portion of the object obj61 that has not yet been printed. A guide mark g66 is added to the guide pattern and constitutes a line extending in the X-direction and passing through the point p6.

<When the Unfinished Object is a Stroke Font>

Figure 7:
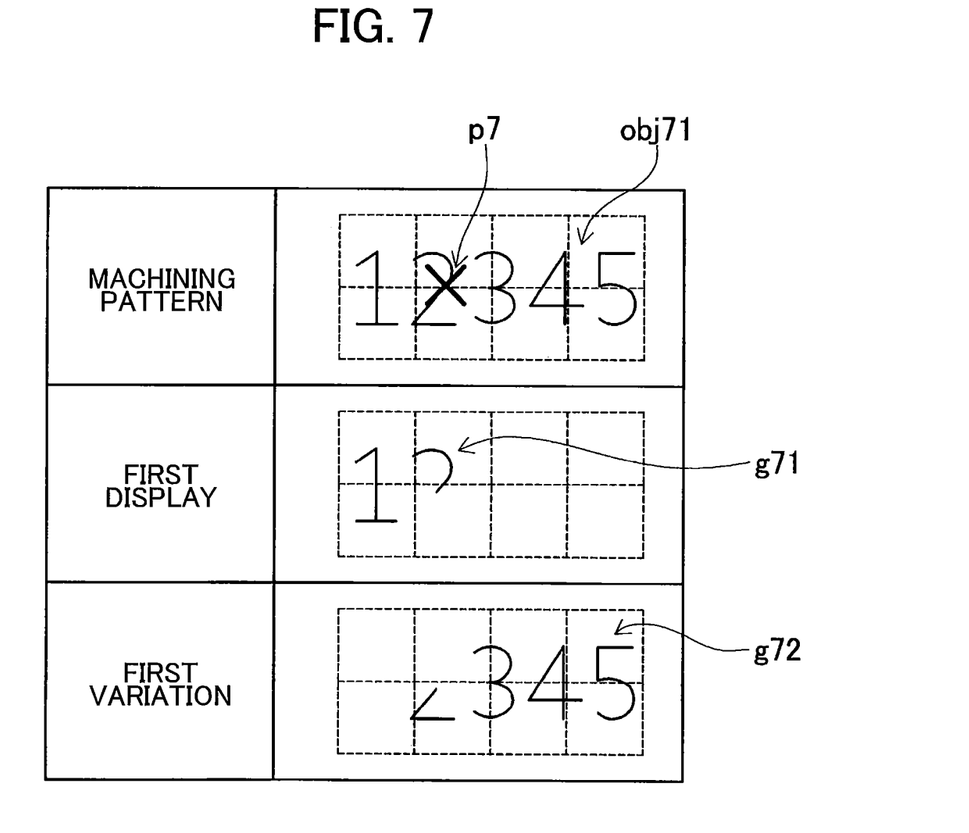
FIG. 7 is an explanatory diagram illustrating a machining pattern configured of an object in a stroke font and corresponding guide patterns.

When the unfinished object is a stroke font, in S45 the CPU 61 determines that the unfinished object is not a TTF (S45: NO) and determines in S49 that the unfinished object is a stroke font or a single line drawing (S49: YES). In this case, in S51 the CPU 61 sets the guide pattern to the drawn lines themselves, and ends the guide pattern generation process. Step S51 will be described next with reference to FIG. 7. In FIG. 7, the machining pattern is an object obj71, which is configured of numbers in a stroke font, and the stopping position is a point p7.

As in FIGS. 5A and 5B, first display in FIG. 7 illustrates a case in which the material properties of the workpiece 7 indicate a smaller reflectance in non-machined areas than that in machined areas. Further, first variation in FIG. 7 illustrates a case in which the material properties of the workpiece 7 indicate a smaller reflectance in machined areas than that in non-machined areas. For the case of the first display, the guide pattern is set to a guide mark g71, which constitutes the portion of the object obj71 that has been printed. When the material properties of the workpiece 7 indicate a smaller reflectance in machined areas (first variation), the guide pattern is set to a guide mark g72, which is the portion of the object obj71 that has not yet been printed.

<When an Object Other than the Unfinished Object is a Two-Dimensional Code>

Next, a case in which the CPU 61 determines in S41 that the print data includes a plurality of objects (S41: YES) and the type of an object other than the unfinished object is a two-dimensional code will be described with reference to the machining pattern and first display in FIG. 8. The guide marks projected when the type of an object other than the unfinished object is a TTF or a stroke font have been described with reference to FIG. 5B. As with TTF and stroke font objects, an outer frame for an object other than the unfinished object is added to the guide pattern when the object is of the two-dimensional code type. As in FIG. 5B, first display in FIG. 8 illustrates a case in which the material properties of the workpiece 7 indicate a smaller reflectance in non-machined areas than that in machined areas. Further, the first display in FIG. 8 depicts a graphic of the guide pattern projected when the entire machining pattern, i.e., the object obj81 in this case, has been printed. Here, the object obj81 is a two-dimensional code. A guide mark g81 is a rectangular frame constituting a minimum bounding box that encloses the entire object obj81. Note that in order to indicate the relative positions of the object obj81 and guide mark g81 in the first display of FIG. 8, the region of the object obj81 that has been printed is labeled as a region re81.

<Variation on a Plurality of Objects>

Figure 9:
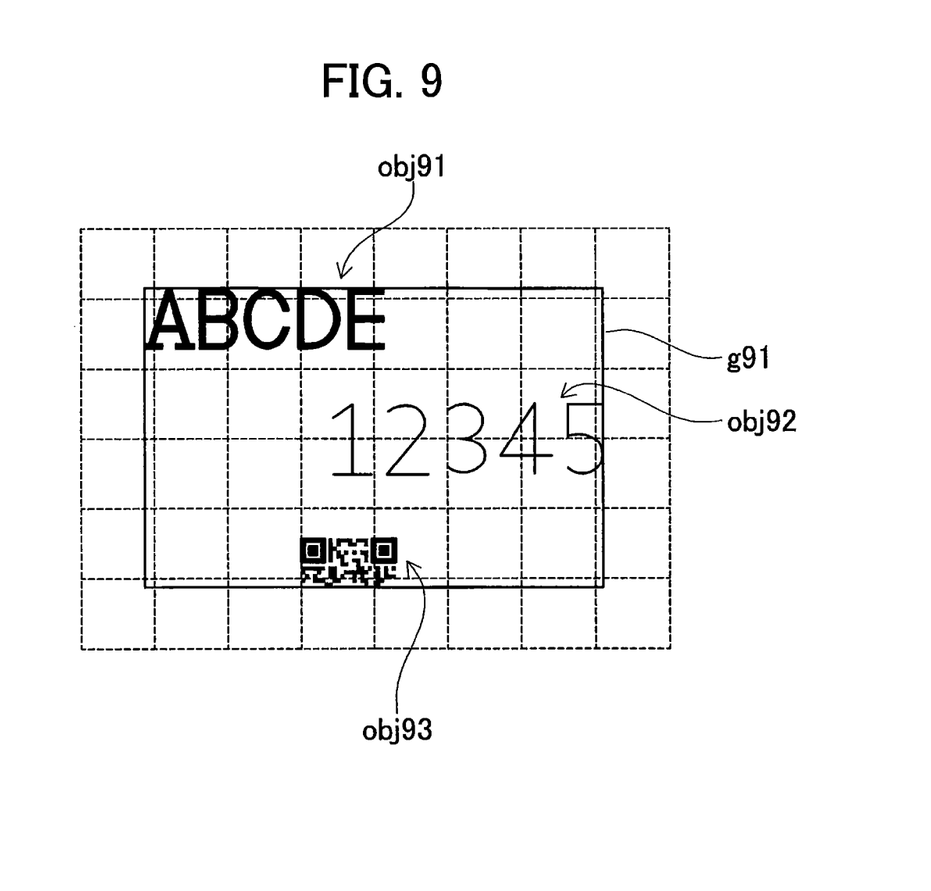
FIG. 9 is an explanatory diagram illustrating a variation of a guide pattern used when a machining pattern includes a plurality of objects.

Next, a variation of the guide pattern used when the print data includes a plurality of objects will be described with reference to FIG. 9. As with FIGS. 5A and 5B, FIG. 9 illustrates an example in which the material properties of the workpiece 7 indicate a smaller reflectance in non-machined areas than that in machined areas. Also as described in FIG. 5A, FIG. 9 illustrates an example in which the machining pattern includes an object obj91, which includes letters in a TTF, an object obj92, which includes numbers in a stroke font, and an object obj93, which is a two-dimensional code; and a stopping position is located in the object obj93. In this variation, rather than individual frames that circumscribe each object, the guide pattern may be set to a guide mark g91, which is a single frame that encloses all of the machined objects obj91, obj92, and obj93. In other words, the guide mark g91 is a single frame that encloses the objects obj91 and obj92, and the machined portion of the object obj93.

In the embodiments described above, the laser machining system 1 is an example of the laser machining apparatus of the present disclosure. The laser oscillator 21 is an example of the laser emission device of the present disclosure, and the visible semiconductor laser 28 is an example of the visible laser beam emission device of the present disclosure. The galvano scanner 18 is an example of the scanner of the present disclosure. The laser controller 6 is an example of the first controller of the present disclosure, and the control unit 51 is an example of the second controller of the present disclosure. The LCD 56 is an example of the display of the present disclosure, and the input operation unit 55 is an example of the interface of the present disclosure. The print data is an example of the machining data of the present disclosure. The machining pattern is an example of the machining pattern of the present disclosure, and the guide pattern is an example of the guide pattern of the present disclosure. The unfinished object is an example of the present disclosure.

The embodiments described above obtain the following effects. After the laser machining apparatus 3 interrupts printing in the machining process, in S15 the PC 2 generates a guide pattern and in S17 projects this guide pattern. Since this guide pattern is generated on the basis of the stopping position and the machining data, the guide pattern can aid the user in positioning the workpiece 7.

Further, when printing is interrupted, the stopping position transmitting unit 46 sends the stopping position to the PC 2. This enables the control unit 51 to identify the stopping point on the basis of the stopping position received from the stopping position transmitting unit 46.

In the guide pattern generation process, the control unit 51 generates a guide pattern with guide marks on the basis of machining data that has been printed or machining data that has not yet been printed. By projecting a guide pattern based on the machining data that has been either printed or not printed, the control unit 51 can aid the user in positioning the workpiece.

In the guide pattern generation process, the control unit 51 also displays frames that enclose the objects. Further, when the unfinished object is a two-dimensional code, the control unit 51 sets a guide pattern to either a frame corresponding to the non-machined area of the two-dimensional code or a frame corresponding to the machined area of the two-dimensional code. Further, when the unfinished object is a stroke font or a single line drawing, the control unit 51 sets the guide pattern to the portion of the object corresponding to the non-machined area or the portion of the object corresponding to the machined area. When the unfinished object is an outline font, the control unit 51 sets the guide pattern to the portion of the outline corresponding to the non-machined area or the portion of the outline corresponding to the machined area. When the unfinished object is an outline font, the control unit 51 also adds to the guide pattern a line extending along the X-direction and passing through the stopping position. When the control unit 51 determines in S41 that there is a plurality of objects, the control unit 51 calculates outer frames for objects other than the unfinished object that correspond to the machined area or the non-machined area and adds these frames to the guide pattern. This method enables the user to easily position the workpiece 7 and also reduces the likelihood of flickering when projecting the guide marks.

Variations of the Embodiments

While the description has been made in detail with reference to the specific embodiments thereof, it would be apparent to those skilled in the art that many modifications and variations may be made thereto.

For example, in the present embodiments, the laser machining apparatus 3 is provided with the stopping position transmitting unit 46 that executes a transmission process when power output from the power supply unit 48 is halted, but the laser machining apparatus 3 may be provided with a stopping position storing unit. In this case, the stopping position storing unit receives power from the battery 47 when the power supply from the power supply unit 48 is interrupted, and the stopping position storing unit executes a process for storing the latest X- and Y-coordinate data in a nonvolatile storage device. Hence, once the control unit 51 returns to an online state and is capable of communicating with the laser machining apparatus 3, the control unit 51 can identify the stopping position on the basis of the latest X- and Y-coordinate data stored in the nonvolatile storage device.

In the present embodiments, the CPU 61 generates a guide pattern on the basis of the stopping position received from the stopping position transmitting unit 46, but the CPU 61 may be configured to generate a guide pattern on the basis of the last X- and Y-coordinate data that the CPU 61 transmitted to the laser controller 6. However, some time elapses after the CPU 61 transmits X- and Y-coordinate data before laser machining is performed with that data. Consequently, the X- and Y-coordinate data transmitted by the CPU 61 at the time of interruption may deviate from the actual stopping position on the workpiece 7. Therefore, the user may be allowed to specify the resuming position. Specifically, in S9 the CPU 61 may display on the LCD 56 a machining pattern based on the print data and a point based on the X- and Y-coordinate data transmitted at the time of interruption and may execute a process to receive a resuming position specified by the user in the display screen on the LCD 56. The user can adjust the resuming position using both the display screen and guide marks displayed on the LCD 56, thereby reducing deviation between the resuming position and the actual stopping position.

In S43 of the embodiments, the CPU 61 is described as setting the guide pattern to outer frames enclosing the objects, but the guide pattern is not limited to these frames. For example, a portion of the frames may be omitted such that the guide pattern is set to lines of the frames that extend in the X-direction or the Y-direction. Further, the shape of the frames is not limited to a rectangular shape, but may be a polygonal shape that encloses the outer shape of the corresponding object, or may be the outline of the object, for example.

Further, the process for generating the guide pattern in S51 can be used even when the unfinished object is a stroke font in boldface. For a stroke font in boldface, the object is machined by scanning each line a plurality of times with the galvano scanner 18, rather than a single time, in order to enhance the visibility of the object. In this case, the guide pattern can still be set to a graphic of the object.

Further, the guide pattern may be generated according to the same method described in S53, even when the object is rendered using only fill. That is, the guide pattern can be set to a frame surrounding the fill portion that includes the coordinates of the stopping position. Objects that are represented only by fill may arise when printing only the fill, and not the outlines, for characters in TTF or other outline fonts configured of outlines and fill enclosed in the outlines, or when printing graphics or the like constituting only fill without outlines. The guide pattern may also be generated according to the same method described in S53 for a one-dimensional code.

Further, a guide pattern may also be generated according to the same method described in S47 for graphics configured of outlines and fill within the outlines.

In S35 of the embodiments, the CPU 61 determines whether to set the guide pattern in a non-machined area or a machined area according to the reflectance information on the workpiece 7. However, the PC 2 may be configured to set the guide pattern to one of the non-machined area and machined area without regard for reflectance, or may allow the user to select either the non-machined area or the machined area.

When the unfinished object includes a plurality of characters, for example, the CPU 61 may be configured to generate a guide pattern only for the character containing the stopping position. Alternatively, the PC 2 may allow the user to select the region of the object for which the guide pattern is to be generated.

While the laser controller 6 is provided with the battery 47 in the present embodiments, the laser controller 6 need not be provided with a battery, but may have a circuit configuration that includes capacitors, for example.

In the present embodiments, a power outage is described as the reason that the laser machining apparatus 3 halts printing during a printing operation, but the present disclosure is not limited to this reason. For example, the disclosure may be applied to other cases that cause the laser machining apparatus 3 to halt printing, such as when the power code for the laser machining apparatus 3 is pulled out of the outlet or when the user accidentally shuts off the power switch on the laser machining apparatus 3.

What is claimed is:

1. A laser machining apparatus comprising:
   a laser beam emission device configured to emit a laser beam;
   a visible laser beam emission device configured to emit a visible laser beam;
   a scanner configured to scan the laser beam and the visible laser beam in a scanning direction; and
   a controller configured to perform:
   (a) generating machining data based on a machining job, the machining data including coordinate data representing a machining pattern to be machined on a workpiece;
   (b) machining the workpiece with the laser beam according to the machining data by controlling the laser beam emission device and the scanner;
   (c) generating, in response to receiving a resuming command after the (b) machining has been halted at a stopping position, a guide pattern based on a stopping point coordinate and the machining data, the guide pattern being used for resuming the (b) machining from the stopping position, the stopping point coordinate indicating the stopping position and being determined by the coordinate data; and
   (d) projecting the guide pattern onto the workpiece with the visible laser beam by controlling the visible laser beam emission device and the scanner.

2. The laser machining apparatus according to claim 1, further comprising a memory,
   wherein the controller is configured to further perform (e) storing the stopping point coordinate into the memory in a case where the (b) machining is halted at the stopping position, the stopping position being a position where the scanner halts scanning the laser beam, and
   wherein the (c) generating generates the guide pattern using the stopping point coordinate stored in the memory.

3. The laser machining apparatus according to claim 1, wherein the controller comprises:
   a first controller configured to perform the (b) machining; and
   a second controller configured to perform the (a) generating and the (c) generating,
   wherein the first controller is configured to further perform (f) transmitting the stopping point coordinate to the second controller in a case where the (b) machining is halted at the stopping position, the stopping position being a position where the scanner halts scanning the laser beam, and wherein the (c) generating generates the guide pattern using the stopping point coordinate received from the first controller.

4. The laser machining apparatus according to claim 1, further comprising:
- a display; and
- an interface, wherein the controller comprises:
- a first controller configured to perform the (b) machining; and
- a second controller configured to perform the (a) generating, wherein the (a) generating generates a plurality of sets of machining data, wherein the second controller is configured to further perform (g) sequentially transmitting the plurality of sets of machining data to the first controller, and wherein the first controller is configured to further perform:
- (h) displaying on the display the stopping position based on the stopping point coordinate along with the machining pattern based on the machining data in a case where the (b) machining is halted at the stopping position, the stopping point coordinate being defined by latest one of the plurality of sets of machining data; and
- (i) receiving a resuming position via the interface, the resuming position designating a position where the machining is to be resumed.

5. The laser machining apparatus according to claim 1, wherein the (c) generating generates the guide pattern based on one of machined data and non-machined data representing one of a machined portion and a non-machined portion of the machining pattern, the machined data representing the machined portion of the machining pattern positioned in a machined area, the non-machined data representing the non-machined portion of the machining pattern positioned in a non-machined area.

6. The laser machining apparatus according to claim 5, wherein the one of a machined portion and a non-machined portion of the machining pattern includes at least one object making up the machining pattern, and
wherein the (c) generating generates a frame circumscribing the at least one object as the guide pattern.

7. The laser machining apparatus according to claim 6, wherein the machining pattern includes an unfinished object having a first portion positioned in the machined area and a second portion positioned in the non-machined area, the unfinished object including the stopping position, and
wherein the (c) generating comprises:
- (c1) determining a type of the unfinished object; and
- (c2) generating the guide pattern based on the type of the unfinished object.

8. The laser machining apparatus according to claim 7, wherein in a case where the (c1) determining determines that the type of the unfinished object is one of a one-dimensional code and a two-dimensional code, the (c2) generating generates, as the guide pattern, the frame circumscribing one of the first portion and the second portion of the unfinished object included in the one of a machined portion and a non-machined portion of the machining pattern.

9. The laser machining apparatus according to claim 7, wherein in a case where the (c1) determining determines that the type of the unfinished object is a character in a stroke font configured of a single line, the (c2) generating generates, as the guide pattern, one of the first portion and the second portion of the unfinished object included in the one of a machined portion and a non-machined portion of the machining pattern.

10. The laser machining apparatus according to claim 7, wherein in a case where the (c1) determining determines that the type of the unfinished object is a character in a stroke font configured of a single line, the (c2) generating generates, as the guide pattern, the frame circumscribing one of the first portion and the second portion of the unfinished object included in the one of a machined portion and a non-machined portion of the machining pattern.

11. The laser machining apparatus according to claim 5, wherein the machining pattern includes an unfinished object having a first portion positioned in the machined area and a second portion positioned in the non-machined area, the unfinished object including the stopping position,
wherein the (c) generating comprises:
- (c1) determining a type of the unfinished object; and
- (c2) generating the guide pattern based on the type of the unfinished object, and wherein in a case where the (c1) determining determines that the type of the unfinished object is an outline font rendering a character with outlines and fill inside the outlines, the (c2) generating generates, as the guide pattern, the outlines of the unfinished object included in the one of a machined portion and a non-machined portion of the machining pattern.

12. The laser machining apparatus according to claim 11, wherein the controller is configured to further perform (j) adding to the guide pattern a line extending in the scanning direction and passing through the stopping position.

13. The laser machining apparatus according to claim 8, wherein the (c) generating further comprises:
- (c3) determining whether the machining pattern includes another object other than the unfinished object and included in the one of a machined portion and a non-machined portion of the machining pattern; and
- (c4) adding, in response to determining that the machining pattern includes the another object, another frame circumscribing the another object to the guide pattern.

14. The laser machining apparatus according to claim 5, wherein the workpiece has material properties, and
wherein the controller is configured to further perform:
- (k) determining the one of machined data and non-machined data according to the material properties.

15. The laser machining apparatus according to claim 14, wherein the machined area of the workpiece has a first reflectance and the non-machined area of the workpiece has a second reflectance,
wherein the (k) determining determines the machined data as the one of machined data and non-machined data in a case where the first reflectance is greater than the second reflectance, whereas the (k) determining determines the non-machined data as the one of machined data and non-machined data in a case where the second reflectance is greater than the first reflectance.

* * * * *